United States Patent [19]
Tavallaei et al.

[11] Patent Number: 5,797,018
[45] Date of Patent: Aug. 18, 1998

[54] APPARATUS AND METHOD OF PREVENTING A DEADLOCK CONDITION IN A COMPUTER SYSTEM

[75] Inventors: Siamak Tavallaei, Spring; Joseph P. Miller, Cypress, both of Tex.

[73] Assignee: Compaq Computer Corporation, Houston, Tex.

[21] Appl. No.: 568,478

[22] Filed: Dec. 7, 1995

[51] Int. Cl.⁶ ............................................. G06F 13/14
[52] U.S. Cl. ........................ 395/726; 395/280; 395/287; 395/288; 395/289; 395/290; 395/293; 395/299; 395/306; 395/308
[58] Field of Search ................................ 395/287, 290, 395/293, 299, 306, 308, 726, 280, 288, 289

[56] References Cited

U.S. PATENT DOCUMENTS

| | | | |
|---|---|---|---|
| 4,870,566 | 9/1989 | Cooper et al. | 364/200 |
| 4,933,845 | 6/1990 | Hayes et al. | 364/200 |
| 5,121,487 | 6/1992 | Bechtolsheim | 395/325 |
| 5,133,074 | 7/1992 | Chou | 395/725 |
| 5,150,467 | 9/1992 | Hayes et al. | 395/325 |
| 5,265,005 | 11/1993 | Schmidt et al. | 364/147 |
| 5,305,442 | 4/1994 | Pedersen et al. | 395/325 |
| 5,450,551 | 9/1995 | Amini et al. | 395/299 |
| 5,455,915 | 10/1995 | Coke | 395/325 |
| 5,467,295 | 11/1995 | Young et al. | 395/200.05 |
| 5,517,626 | 5/1996 | Archer et al. | 395/290 |
| 5,517,650 | 5/1996 | Bland et al. | 395/750 |
| 5,542,056 | 6/1996 | Jaffa et al. | 395/306 |
| 5,592,509 | 1/1997 | McClear et al. | 375/219 |
| 5,594,882 | 1/1997 | Bell | 395/421.02 |
| 5,596,725 | 1/1997 | Ferguson et al. | 395/250 |

*Primary Examiner*—Ayaz R. Sheikh
*Assistant Examiner*—Valorie Darbe
*Attorney, Agent, or Firm*—Pravel, Hewitt, Kimball & Krieger

[57] ABSTRACT

Circuitry for tristating the address and data outputs of a processor to prevent a deadlock condition when the processor and another bus master is accessing a shared resource. The processor is located on a local bus and the other bus master is located on a PCI bus. Bi-directional tristate buffers are placed between the address and data output pins of the processor and the address and data portions of the first bus. If the processor is requesting a local-bus-to-PCI-bus cycle, and the PCI bus master is asserting a request for a local bus shared resource, the processor address and data output pins are tristated by the tristate buffers to allow the PCI bus master cycle to proceed. After the PCI bus master cycle completes, the tristate buffers are reenabled to allow the processor cycle to complete.

43 Claims, 5 Drawing Sheets

APPARATUS AND METHOD OF PREVENTING A DEADLOCK CONDITION IN A COMPUTER SYSTEM

BACKGROUND OF THE INVENTION

1. Field of the Invention

The invention relates to computer bus cycles, and more particularly, to preventing a deadlock condition resulting from two bus masters requesting a common resource.

2. Description of the Related Art

Microprocessors continue to improve in speed and performance. With such rapid improvement, prices of microprocessors have dropped dramatically. For example, where the 80386 family of processors from Intel Corporation were used as the "brains" of a computer system a few years ago, now the prices of the 80386 processors have dropped enough that they are used in other applications. Further, additional peripheral logic has been added to certain 80386 processors to facilitate the use of the processors in these other applications.

For instance, the Intel 386EX embedded processor includes such integrated peripheral functions as a clock and power management unit, an interrupt control unit, a timer control unit, a watchdog timer unit, asynchronous and synchronous serial I/O units, a parallel I/O unit, a DMA and bus arbiter unit, and a refresh control unit. The clock and power management unit provides one mode in which the CPU core can be powered down to a known state while the peripheral units remain active, and another mode in which both the CPU core and the peripheral units are powered down to a known state. The interrupt control unit includes two 8259A interrupt control modules which can handle up to 8 interrupt requests. The refresh control unit simplifies dynamic memory controller design by providing a programmable interval timer that keeps track of time, providing arbitration logic to gain control of an external bus to run refresh cycles, logic to generate addresses to refresh DRAM rows individually, and logic to signal the start of a refresh cycle.

In today's computer systems, there are multiple levels of buses each coupled to various devices. These multiple buses include the host processor bus, the Peripheral Component Interconnect (PCI) bus, and the Industry Standard Architecture (ISA) or Extended Industry Standard Architecture (EISA) bus. Devices connected to the different buses may request a common resource, such as memory, at the same time. Under certain conditions, requests from different bus masters for the same resource may cause a deadlock condition if one master is not "backed off" to relinquish its request for the resource. One disadvantage of 386 processors is that they do not include a backoff input to force the processor off the bus to prevent the deadlock condition. Once the deadlock condition occurs, further transactions in the computer system are prevented.

Therefore, it is desirable that a solution be developed to avoid deadlock conditions.

SUMMARY OF THE PRESENT INVENTION

Circuitry according to the present invention tristates the address and data signals driven by a processor when a potential deadlock is detected between the processor, which is connected to a first bus, and a bus master, which is connected to a second bus. A deadlock may occur if a processor-to-second-bus cycle is pending and the bus master requests access to a resource on the first bus. In the preferred embodiment of the present invention, tristate buffers are placed between the processor and the first bus for isolating the processor address and data output pins from the first bus. The tristate buffers are disabled when the potential deadlock condition is detected, effectively preempting the processor-to-second-bus request. Once the processor address and data output pins are tristated, the second bus master can proceed in accessing the first bus resource. Once the second bus master has completed operation, the tristate buffers are re-enabled and the request for the preempted processor-to-second-bus cycle is reasserted. During the time the tristate buffers are tristated, the processor control pins remain active. Therefore, the preferred embodiment guarantees that no cycle completion signals are provided to the processor during the tristate period.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
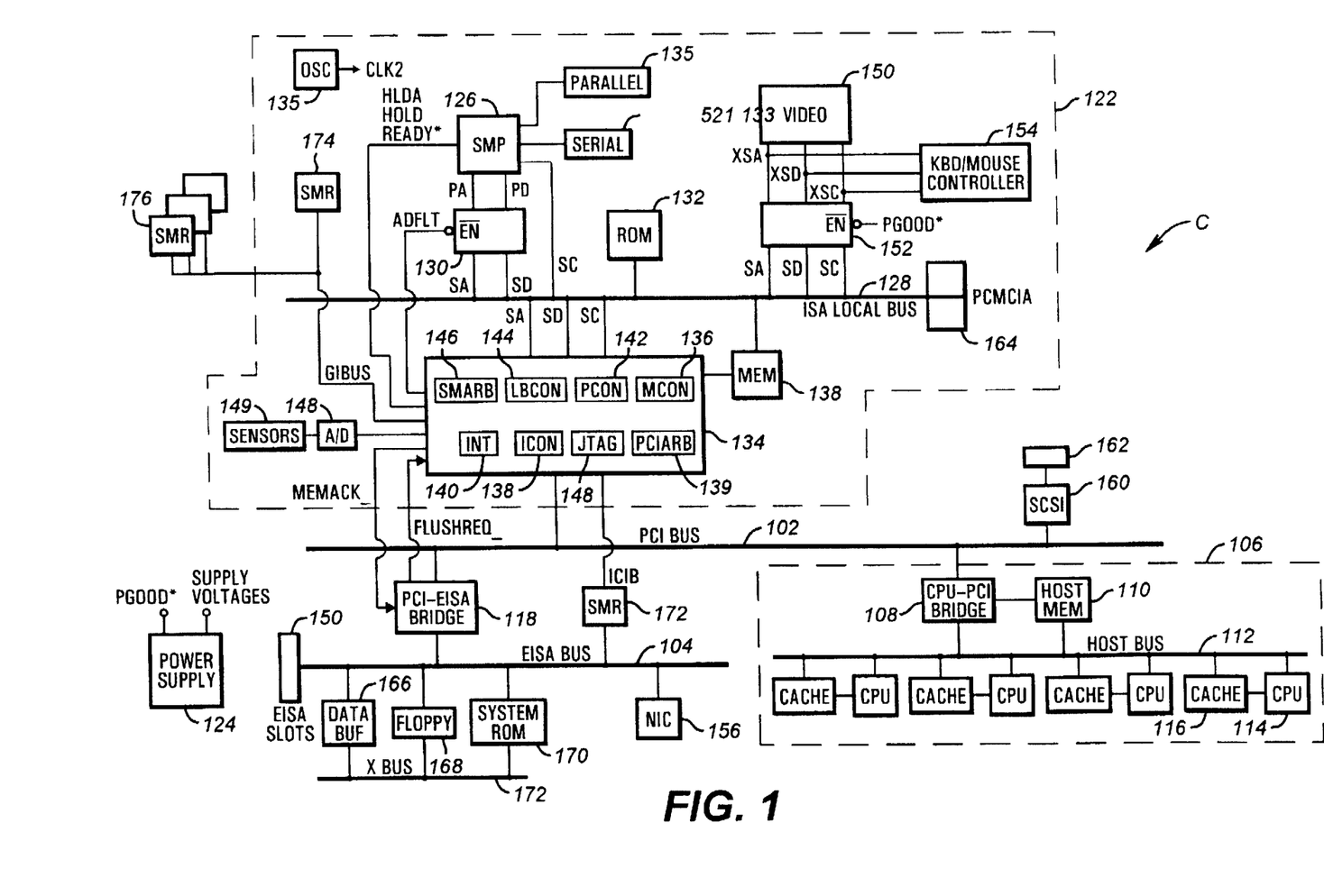
FIG. 1 is a block diagram of an exemplary computer system which includes a bus bridge incorporating the preferred embodiment of the present invention.

Referring now to FIG. 1, a block diagram of an exemplary computer system C is shown. Power to the computer system C is provided by a power supply circuit 124, which produces various supply voltages and a signal PGOOD* for indicating when the supply voltages are stable. In the present description, a signal name followed by either the character "1*" or "_" indicates that the signal is active low. In addition, if the character "!" is placed before a signal name, the signal is inverted.

The backbones of the computer C are a 32-bit PCI bus 102 and 32-bit EISA bus 104. Alternatively, the bus 104 can be an ISA bus 104. A host processor subsystem 106 is connected to the PCI bus 102. The host processor subsystem 106 includes a processor-PCI bridge 108 connected between the PCI bus 102 and a host bus 112 to convert processor cycles to PCI cycles and vice versa. The processor-PCI bridge 108 also includes a memory controller for controlling operations to host memory 110. The processor-PCI bridge 108 is preferably implemented with an ASIC, but alternatively can be implemented with the 82434LX PCI/Cache/Memory Controller (PCMC) from Intel Corp. The host bus 112 is connected to a plurality of CPUs 114. Redundant CPUs 114 are provided in the computer system C according to the preferred embodiment to provide fault tolerance. Each CPU is connected to an external cache 116. Control of the external caches 116 is provided by the processor-PCI bridge 108 or by logic in the cache 116.

Also connected to the PCI bus 102 is a SCSI hard disk controller 160, which controls operations of various SCSI devices through a connector 162. The various devices include hard disk drives and CD-ROM drives.

Connected between the PCI bus 102 and the EISA bus 104 is a PCI-EISA bridge 118. The EISA bus 104 includes a plurality of EISA slots 150 for receiving expansion boards. The EISA bus is also connected to a network interface card (NIC) 156 for controlling communications with an external local area network (not shown). A data buffer 166 is connected to the data portion of the EISA bus 104 to provide an additional data bus XD for various components. A system flash ROM 170 receives its control and address signals from the EISA bus 104 and is connected to the XD bus 172 for data transfer. Preferably, the system flash ROM 170 contains the BIOS information for the computer system C. A floppy controller 168 is also connected to the XD data bus 172 for performing data transfers between a floppy disk drive (not shown) and the computer system C.

The PCI-EISA bridge 118 is implemented with the 82375EB PCI/EISA bridge chip (PCEB) and the 82374EB EISA system controller chip (ESC), both from Intel Corp. Alternatively, the PCI-EISA bridge 118 can be implemented with a single ASIC. The PCI-EISA bridge 118 includes the necessary logic to provide translation between PCI and EISA cycles, including the necessary address and data buffers. Also included are an EISA bus controller and a DMA controller.

The PCI bus 102 is also connected to a system management module (SMM) 122. The system management module 122 detects failures in the computer system C and is capable of correcting certain of those failures. For example, the system management module 122 monitors for noise in the power supply circuit 124 as well as for noise in other components in the computer system C, determines if open and shorted connections exist in the computer system C, checks for failure in the various memory devices, and detects failures in the CPU, bus bridges, hard disk controller, hard disk drives, and NIC 156. The system management module 122 also monitors the environmental conditions of the computer system C, such as temperature and fan operation.

The system management module 122 includes a system management processor (SMP) 126, which is preferably implemented with the Intel 386EX processor. The SMP 126 preferably operates at a frequency of about 25 MHz at a supply voltage of 5 volts. The SMP 126 is coupled to a 16-bit local SM bus 128, which is preferably a subset of the ISA bus. In accordance with the preferred embodiment of the present invention, bi-directional tristate buffers 130 are placed between the processor address and data signals PA and PD and the address and data signals SA and SD of the ISA bus 128. In the illustrated embodiment, the tristate buffers 130 are preferably implemented with high speed bus CMOS switches such as the QST 3384 or 3584 from Quality Semiconductor Inc., although other high speed bus switches could be used. The tristate buffers 130 are enabled if a signal ADFLT is driven low. The signal ADFLT is driven high when a potential deadlock condition is detected to tristate the address and data output pins PA and PD driven by the SMP 126. In a more preferred embodiment, the tristate buffers 130 are actually located or embedded on the SMP 126 to reduce cost and board space requirements, with the ADFLT signal then provided to the SMP 126. In the embedded embodiment, the tristate buffers 130 can either be a second stage of buffers or can be the existing tristate buffers used during hold operations, with additional control provided by the ADFLT signal as well as the existing hold logic. The control signals of the SMP 126 are connected directly to a system management central (SMC) ASIC 134.

A serial port 133 and a parallel port 135 are connected directly to the SMP 126, which includes integrated controllers for controlling communications with the serial and parallel ports. A local read only memory (ROM) 132 is connected to the SM local bus 128. The local ROM 132 stores power-on self-test (POST) code for the system management module 122 as well as for the rest of the computer system C. The ROM 132 preferably has a storage capacity of 4 Mbytes. Also connected to the SM bus 128 is a pair of PCMCIA slots 164 for connection to PCMCIA cards, such as a network interface card or a modem.

The system management central (SMC) ASIC 134 is connected between the SM bus 128 and the PCI bus 102. The SMC 134 includes a memory controller (MCON) 136 for controlling operations to a local SM memory 138. The local memory 138 is preferably implemented with DRAMs and has a storage capacity of 2 Mbytes. The local memory 138 is expandable to 4 Mbytes of storage capacity. The local memory 138 is used to store data and code for execution by the SMP 126.

The SMC 134 also contains a PCI interface (ICON) 138 for interfacing the PCI bus 102. The ICON 138 includes the necessary PCI master and PCI slave logic. The SMC 134 also includes a PCI arbiter 139, as well as an interrupt controller 140 for gathering various interrupt signals from the PCI bus 102 as well as other remote devices. The SMC 134 also includes a processor controller (PCON) 142, which acts as an interface to the SMP 126. Also included are a local SM bus arbiter 146 and a local SM bus controller (LBCON) 144 for controlling cycles on the SM bus 128.

There are two possible masters on the SM bus 128—the SMP 126 or the SMC 134 on behalf of a PCI (or EISA) bus master. The SMP 126 is the default master on the SM bus 128 after system reset. If the SMC 134 desires to run a cycle on the SM bus 128, it asserts a bus hold request signal HOLD to the SMP 126 to request control of the SM bus 128. The SMP 125 responds by asserting a signal HLDA to surrender control of the SM bus 128. If the signal HOLD is asserted, and the SMP 126 has a refresh cycle pending, the SMP 126 negates the signal HLDA to request control of the SM bus 128. Upon sampling the signal HLDA asserted and after completion of the SMC cycle, the SMC 134 negates the signal HOLD to let SMP 126 run the refresh cycle. The SMP 126 performs the arbitration between SMP and refresh accesses to the local bus 128.

The SMC 134 further includes logic for interfacing an analog-to-digital converter 148, which is connected to various sensors 149 for monitoring temperature, voltage levels, noise in various components, system bus utilization, and other functions. The SMC 134 also includes logic for performing certain miscellaneous functions such as fan speed monitoring, error display control for the front panel of the computer system C, power management for energy conservation, tamper reporting, and serial number management.

Another block of logic in the SMC is the JTAG boundary scan block 148. The JTAG boundary scan block 148 allows the SMP 126 to run a boundary scan of all scanable components in the computer system C. The JTAG block 148 includes a response FIFO set which allows the SMP 126 to pipeline several commands to the JTAG port. The JTAG block 148 is capable of reporting the various conditions of the computer system C to the operator via the computer screen display (not shown) or through the modem or local area network connected through the PCMCIA slots 164.

Also coupled to the SM bus 128 is a video controller 150. The video controller 150 is connected through bi-directional tristate buffers 152 to the SM bus 128. The address, data, and control portions connected to the video controller 150 are labelled XSA, XSD and XSC. The enable input of the tristate buffers 152 is connected to the inverted state of the power good signal PGOOD*, which is asserted low when the power supply voltages in the computer system C are stable. The tristate buffers 152 are provided between the video controller 150 and the SM bus 128 to match the propagation delays associated with the address and data signals driven by the SMP 126 due to the tristate buffers 130. Also connected to the signals XSA, XSC and XSD are a keyboard and mouse interface 154.

A plurality of system management remote (SMR) ASICs 172, 174 and 176 are connected to the SMC 134 for gathering interrupt information from remote sources, such as various processor, memory, and I/O cards. The SMRs are implemented with relatively small ASICs to minimize cost. Thus, one SMC can be used with many SMRs to allow the SMM 122 to monitor the rest of the computer system C. The SMR 174 is located in the SMM 122, and the SMRs 176 are located in various remote modules. Interrupts provided by SMRs 174 and 176 are gathered using time division multiplexing by the interrupt controller 140 in the SMC 134 over a bus GIBUS. The SMR 172 is located in the expansion subsystem. The SMR 172 receives the EISA IRQ signals and passes the interrupts via a bi-directional serial link bus ICIB to the interrupt controller 140. The functions of the SMRs 172, 174 and 176 also include filtering the interrupts to remove positive glitches and stretching negative pulsing interrupts. Once the SMC 134 receives an interrupt from one of the SMRs, it performs a determination of the source of the interrupt. If the source of an interrupt is unknown due to slot sharing, the SMP 126 can scan the SMRs 172, 174 or 176 via the JTAG block 148 to determine the interrupt source.

Figure 2:
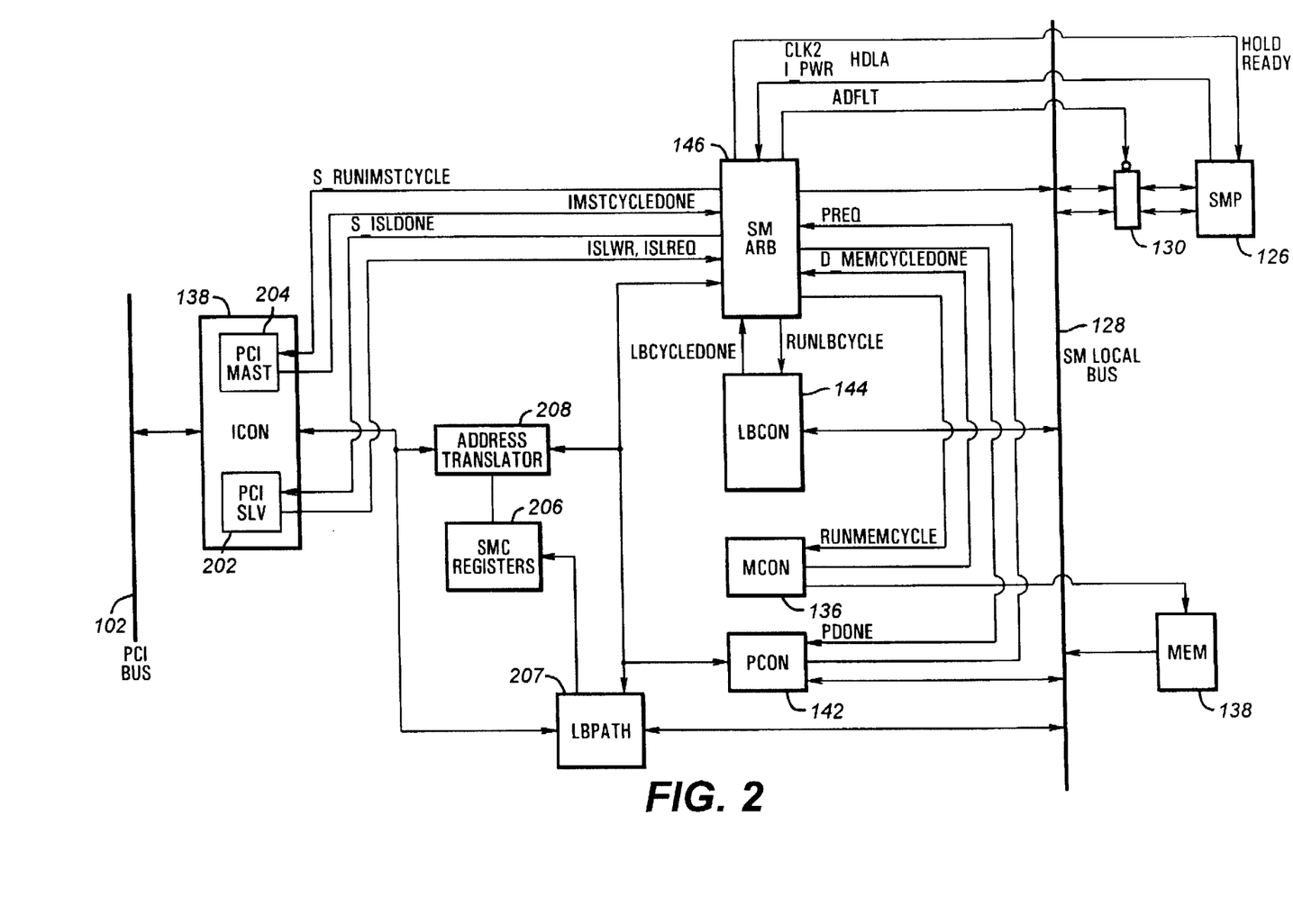
FIG. 2 is a block diagram of various modules in the bus bridge of FIG. 1.

Referring now to FIG. 2, a block diagram is shown of some of the major blocks and their interconnecting signals in the SMC 134. The signal ADFLT for tristating the address and data outputs of the SMP 126 is provided by the SM arbiter 146. There are two possible masters on the SM local bus 128, the SMP 126 and a PCI bus master. A request from the SMP 126 is indicated by a signal PREQ asserted by the PCON 142. A request from a PCI bus master is indicated by a signal ISLREQ generated by PCI slave logic 202 in the ICON 138. The signals PREQ and ISLREQ are provided to the SM arbiter 146. The various cycles executable by the modules in the SMC 134 include a refresh cycle to SM memory 138, a PCI cycle to the video controller 150, a SMP cycle to SMC registers 206, which include various memory and I/O map registers and configuration registers; a PCI cycle to the SMC registers 206; a SMP cycle or a PCI master cycle to the SM memory 138; a SMP cycle or a PCI master cycle to the ROM 132; a SMP cycle or a PCI master cycle to the SM local bus 128; a SMP cycle or a PCI master cycle to the JTAG logic 148; and a SMP cycle to the video controller 150. A clock signal CLK2, preferably having a frequency of approximately 50 MHz if the power supply voltage is 5 volts, is provided by an external oscillator 135 to the SMP 126 and various modules in the SMC 134. The SMP 126 also provides a signal I_PWR to indicate processor write or read cycles. When a PCI master is requesting a resource in the SMM 122, the SM arbiter 146 asserts the signal HOLD to the SMP 126, which the SMP 126 acknowledges by asserting the signal HLDA.

Cycles on the SM local bus 128, other than to the SM memory 138, requested by the SMP 126 or a PCI bus master are generated by the LBCON 144. The LBCON 144 controls accesses to the video controller 150 and the ROM 132. If the SM arbiter 146 detects a request for the SM local bus 128, the video controller 150, or the ROM 132 from the SMP 126 or the PCI slave logic 202, it asserts a signal RUNLBCYCLE to the LBCON 144. In response to assertion of the signal RUNLBCYCLE, the LBCON 144 generates the appropriate cycles on the SM local bus 128. Once the requested local bus cycle has completed, the LBCON 144 asserts a signal LBCYCLEDONE back to the SM arbiter 146 to indicate completion of the local bus cycle. When the SM arbiter 146 detects the signal LBCYCLEDONE asserted, it negates the signal RUNLBCYCLE.

If the SM arbiter 146 detects a request for the SM memory 138 from the SMP 126 or from a PCI bus master, it asserts a signal RUNMEMCYCLE to the MCON 136. Memory requests from the SMP 126 include read and write cycles as well as memory refresh cycles. As noted earlier, the SMP 126 preferably includes logic to arbitrate between refresh and other memory cycles. In response to assertion of the signal RUNMEMCYCLE, the MCON 136 provides the necessary control signals to the SM memory 138 to perform the requested operation. When a memory operation is completed, the MCON 136 asserts a signal D_MEMCYCLEDONE back to the SM arbiter 146. In response, the SM arbiter 146 negates the signal RUNMEMCYCLE.

If the SM arbiter 146 detects a SMP-to-PCI cycle, it asserts a signal S_RUNIMSTCYCLE to PCI master logic 204 in the ICON 138. In response to the assertion of the signal S_RUNIMSTCYCLE, the PCI bus master 204 obtains control of the PCI bus 102 to run the desired cycle. Once the PCI cycle completes, the PCI master 204 responds by asserting the signal IMSTCYCLEDONE. A few CLK2 periods later, the SM arbiter deasserts the signal S_RUNIMSTCYCLE. When the SM arbiter 146 negates the S_RUNIMSTCYCLE signal, a signal D_IMSTCYCLEDONE in the PCI master logic 204 is negated one PCICLK period later, which one PCICLK period causes the signal IMSTCYCLEDONE to be negated.

When the PCI or SM local bus cycles have completed, the SM arbiter 146 drives a signal PDONE to the PCON 142 to indicate the completion of a SMP requested cycle, or asserts a signal S_ISLDONE to the PCI slave logic 202 to indicate the completion of a PCI bus master requested cycle.

The PCI bus 102 is preferably 32 bits wide and the SM local ISA bus 128 is either 16 bits or 8 bits wide. An address translator 208 is provided in the SMC 134 to map SM addresses and PCI addresses to various "match" signals provided to the PCON 142, PCI slave logic 202, and the SM arbiter 146. A local bus data path module 207 contains all the logic that is used to capture data from the SM bus 128 and for multiplexing data from the PCI bus 102 to the SM bus 128.

A deadlock condition can arise between the SMP and a PCI bus master. For example, if a SMP-to-PCI request is pending and a PCI bus master asserts a request for a resource in SM space, such as the various devices connected to the SM bus 128, a potential deadlock condition may arise if the PCI bus master is the PCI-EISA bridge 118. The SMP 126, which is implemented with the 386EX processor, does not have a backoff input to force the SMP 126 off the SM bus 128. Additionally, if the request for the SM memory 138 originates from an EISA bus master, no provision is provided in the EISA bus standard to retry EISA requests. Normally, the SMP 126 is held off the SM bus 128 when the SMC 134 asserts the signal HOLD. However, once the SMP 126 has started a cycle, it ignores the state of the signal HOLD until a signal READY* is asserted low by the SMC 134 to indicate the completion of the current bus cycle. Thus, if the SMP 126 is requesting a cycle on the PCI bus 102 (or EISA bus 104) and an EISA bus master has control of the PCI bus 102 and is requesting access to a resource in the SMM 122, a deadlock condition would occur since the EISA bus master cannot be retried and the READY* signal cannot be asserted by the SMC 134 because the cycle has not completed on the PCI bus 102. To prevent deadlock, the SMP 126 is taken off the SM bus 128 by driving the signal ADFLT high to tristate processor address and data output signals PA and PD. Thus, even though the processor continues to drive its data (if a write cycle) and address output pins in the illustrated embodiment, the SM bus 128 is available for the PCI master cycle to run on. In the embedded embodiment, the processor core logic continues to drive the data (if a write cycle) and address, but the output buffers are simply tristated due to the ADFLT signal operation. For either case, the processor is acting as if the present cycle is continuing, with the cycle control signals still being provided and recognized, only the address and data are not present.

The control signals between the SMP 126 and the SMC 134 include the READY* signal and a next address signal NA* driven by the SMC 134 to indicate when the SMP 126 can proceed with the next cycle. The signal READY* is driven low by the PCON 142 to indicate the end of the current transaction. In pipelined operations, the signal NA* is asserted low to indicate that the SMP 126 can provide the address of the next cycle. The SMC 134 does not assert these two signals when it detects a potential deadlock condition. Nor does the SMC 134 assert the HOLD signal to process the PCI-to-SMC request, as the state of the HOLD signal would be ignored by the SMP 126 until after the READY* signal is asserted. Instead, the address and data output pins PA and PD are isolated from the SM bus 128, with the SMP 126 waiting for the assertion of either signal READY* or NA* to proceed to the next cycle. All the processor output control signals remain driven by the SMP 126 while the SMC 134 is performing the PCI-to-SMC cycle on the SM bus 128 after preempting the SMP-to-PCI cycle. In addition, the address output signals PA also remain driven, as well as the data output signals PD if a write cycle. Thus, if the pending SMP-to-PCI cycle is a write cycle, the address, data, and cycle control output signals are continuously driven. However, if a read cycle, only the address and cycle control output signals are continuously driven. When the PCI-to-SMC cycle completes, the tristate buffers 130 are re-enabled to allow the SMP-to-PCI cycle to complete. The SMP 126 does not perform a new cycle as the control signals have remained unchanged. The output control signals of the 386EX processor include an address status signal ADS* to indicate a valid bus cycle, a signal D/C* to indicate if the current cycle is a data cycle or a control cycle, a signal M/IO* to indicate if the current cycle is a memory or I/O cycle, a signal REFRESH* to indicate a refresh cycle, a signal SMIACT* to indicate that the processor is in system management mode, and the signal I_PWR to indicate a write or read cycle.

In addition, the tristate buffers 130 in the preferred embodiment are also used to tristate the address and data outputs of the SMP 126 if an SMP write cycle occurs immediately after a read cycle. The read data may still be driven on the SM local bus 128 if the target SM bus slave is a device that requires a long delay in turning off its data output drivers. For example, the keyboard/mouse controller 154, preferably the 8742 part from Intel, has a float delay time of approximately 85 ns. After a SMP read cycle has completed, the signal READY* is asserted by the PCON 142, which allows the SMP 126 to initiate a write cycle by driving write data onto the SM bus 128. However, if the SM bus slave of the previous read cycle has not floated its data output pins, data contention will occur between the processor write data output and the SM bus slave data output. To avoid the data contention, the signal ADFLT is driven high by the SM arbiter 146 preferably for eight CLK2 periods to avoid contention between the write data driven by the SMP 126 and the read data on the SM local bus 128. If the previous read cycle is from a PCI master, then data contention is avoided by maintaining the HOLD signal asserted for eight more CLK2 periods to prevent the SMP 126 from starting the next write cycle.

Figure 3A:
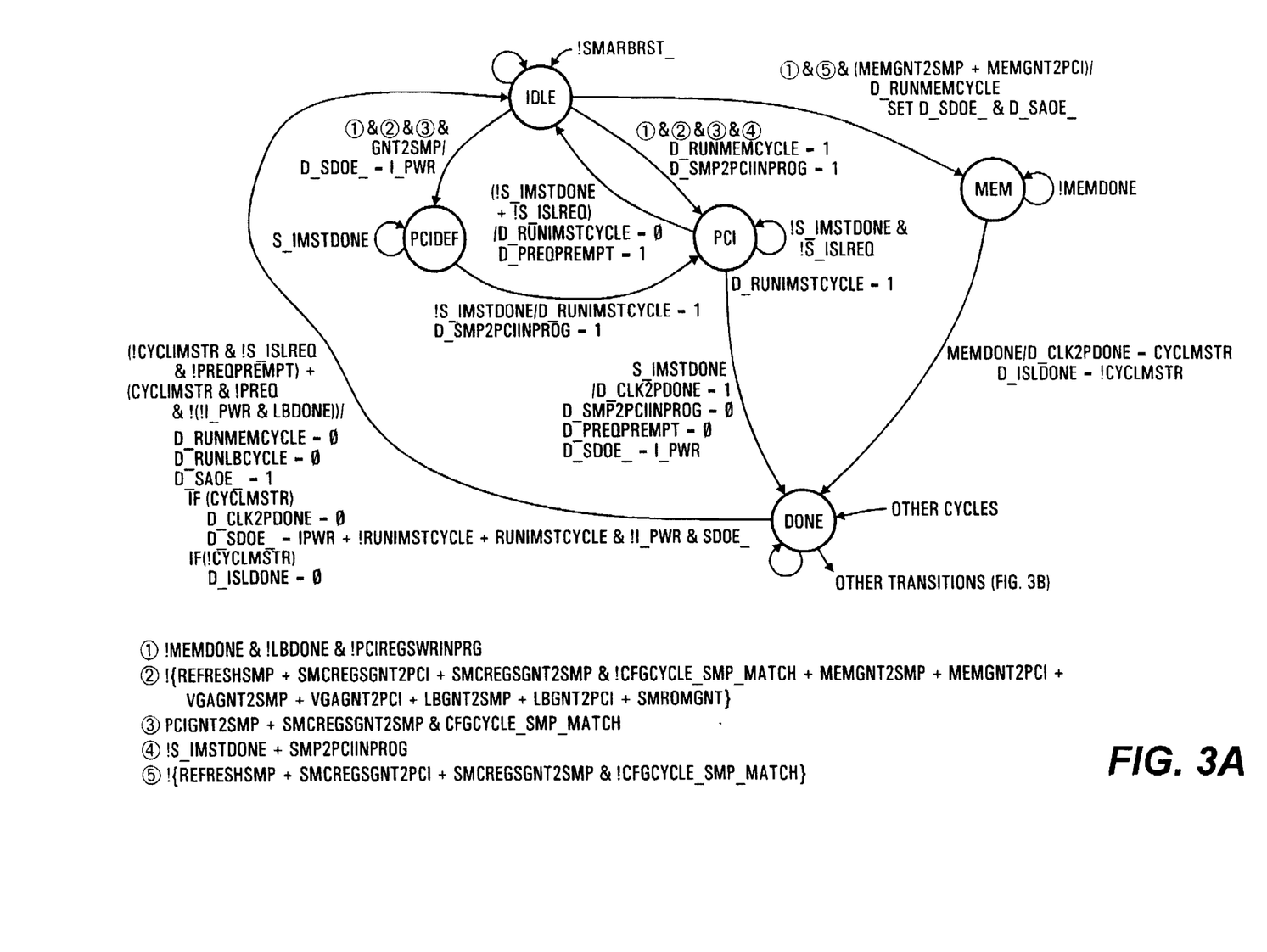
FIGS. 3A and 3B are a state diagram of a cycle dispatch state machine in an arbiter module in the bus bridge of FIG. 1.
Figure 3B:
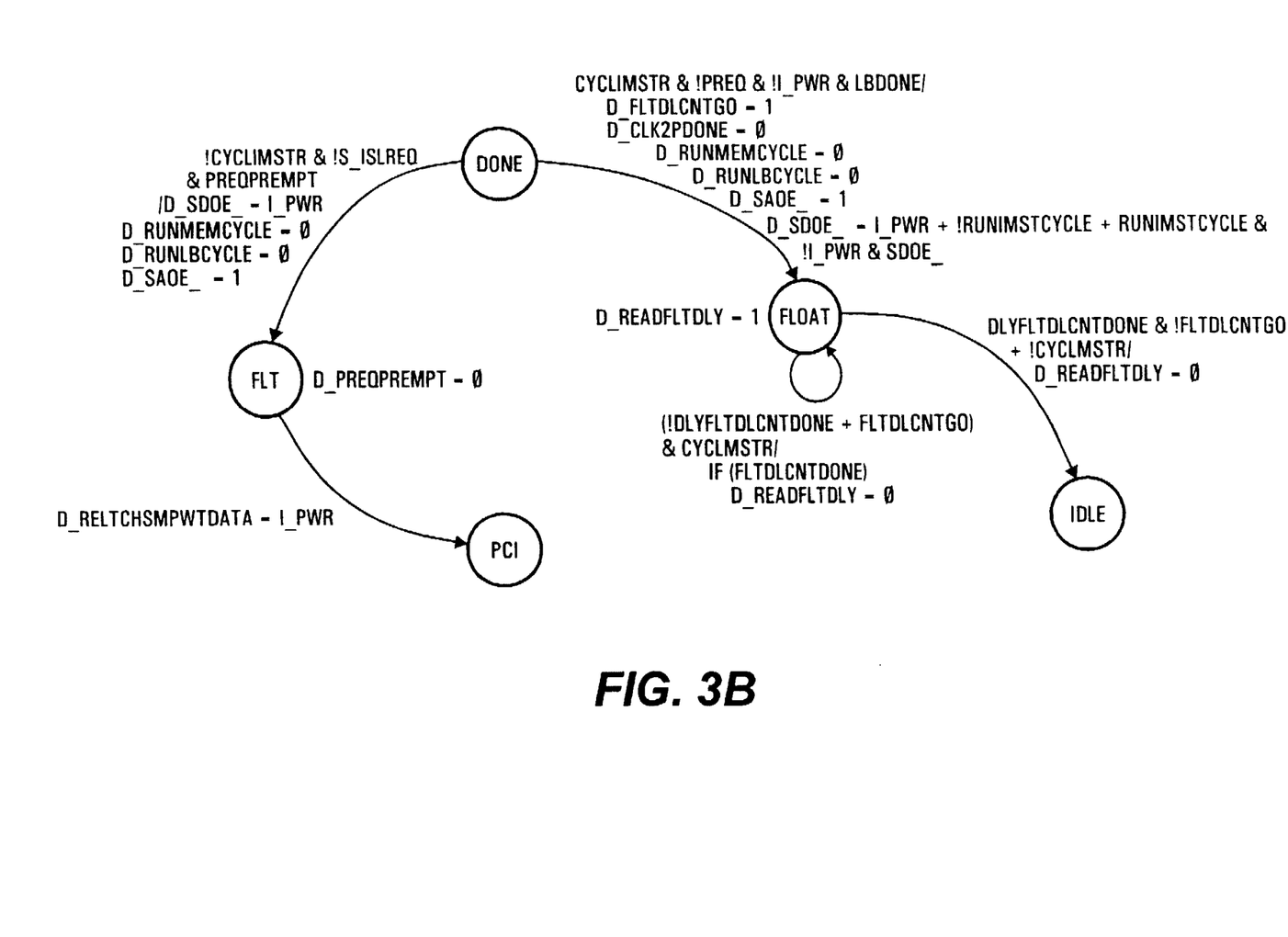

Referring now to FIGS. 3A and 3B, a flow diagram is shown of a cycle dispatch state machine in the SM arbiter 146 for generating the appropriate signals to the modules in the SMC 134 to perform requested cycles. Only the portions of the cycle dispatch state machine relevant to the generation of the signal ADFLT are shown for the sake of clarity.

On assertion of a reset signal SMARBST_, which occurs during power up, the cycle dispatch state machine enters state IDLE. In state IDLE, various output signals from the state machine are initialized. The following signals are negated low: D_RUNIMSTCYCLE, D_CLK2PDONE, D_READFLTDLY, D_FLTDLCNTGO, D_ISLDONE, D_RUNMEMCYCLE, D_RUNLBCYCLE, and D_RELTCHSMPWTDATA. The following signals are negated high: D_SDOE_ and D_SAOE_. Signal names preceded by "D_" indicate that the signals are provided to the D inputs of D-type flip-flops, which are clocked by the CLK2 signal. The non-inverting outputs of the D-type flip-flops produce the signal names without the prefix "D_." Thus, for example, the signal D_READFLTDLY is provided to the D input of a D-type flip-flop, whose non-inverting output produces a signal READFLTDLY. Also in state IDLE, a SMP request preempt signal D_PREQPREMPT is set to the state of a signal PREQPREMPT, which is initially set low on system reset.

The signal PREQPREMPT is asserted to preempt a pending SMP-to-PCI cycle if a PCI request is asserted for a SM resource. This avoids any potential deadlock between an EISA bus master and the SMP 126. When a SMP-to-PCI cycle is preempted, the cycle dispatch state machine returns to state IDLE to handle the PCI master request. Thus, the state of the signal PREQPREMPT must be maintained to ensure that the cycle dispatch state machine "remembers" to reassert the preempted SMP-to-PCI request after the PCI master cycle is completed.

When either signal READFLTDLY or PREQPREEMPT is asserted high, the signal ADFLT provided to the tristate buffers 130 is driven high to tristate the address and data outputs PA and PD from the SMP 126.

For purposes of this discussion, the following describes the default states of the various signals of the cycle dispatch state machine. Thus, unless otherwise mentioned in the state diagram, signals D_RELTCHSMPWTDATA and D_FLTDLCNTGO are set low. The following signals are latched to their set state until changed: D_CLK2PDONE, D_ISLDONE, D_RUNIMSTCYCLE, D_RUNMEMCYCLE, D_RUNLBCYCLE, D_SMP2PCIINPROG, D_PREQPREMPT, D_READFLTDLY, D_SDOE_, and D_SAOE. In addition, transitions of the cycle dispatch state machine occur on the rising edge of the signal CLK2.

The state machine transitions from state IDLE to state PCI if the following four condition are true. The first condition is true if a memory done signal MEMDONE, a LBCON done signal LBDONE, and a signal PCIREGSWRINPRG are all negated, indicating that the SMC 134 is not currently processing a request. The signal PCIREGSWRINPRG is asserted high if a SMP write cycle accesses a register in the SMC 134 clocked by the PCI bus clock PCICLK. The signal PCIREGSWRINPRG is provided to ensure proper timing. The second condition is true if a signal REFRESHSMP is negated low to indicate that a refresh cycle is not pending; a signal SMCREGSGNT2PCI is negated low to indicate that a PCI-to-SMC-register cycle is not pending; the AND of a signal SMCREGSGNT2SMP and a signal CFGCYCLE_SMP_MATCH is not true to indicate that an SMP-to-SMC-register cycle is not pending; signals MEMGNT2SMP and MEMGNT2PCI are both negated low to indicate that a memory cycle is not pending; and signals VGAGNT2SMP, VGAGNT2PCI, LBGNT2SMP, LBGNT2PCI and SMROMGNT are all negated low, indicating that a SMP-to-video-controller cycle, a PCI-to-video-controller cycle, a SMP-to-SM-local-bus cycle, a PCI-to-local-bus cycle, and a ROM cycle are not pending, respectively. The third condition is true if a signal PCIGNT2SMP is asserted high to indicate the grant of a SMP-to-PCI cycle or if both signals SMCREGSGNT2SMP and CFGCYCLE_SMP_MATCH are driven high to indicate a SMP-to-PCI configuration cycle. The fourth condition is true if a signal S_IMSTDONE is deasserted low, indicating that the PCI master logic 204 has not asserted the signal IMSTCYCLEDONE, and a signal SMP2PCIINPROG is negated low to indicate that a SMP-to-PCI cycle is not in progress. Effectively, the fourth condition is true if the previous SMP-to-PCI cycle has finished. Thus, the transition from state IDLE to state PCI occurs if a SMP-to-PCI cycle is requested, none of the requests listed in the second condition are true, and the previous SMP-to-PCI cycle has fully completed. If the first, second and third conditions are true but the fourth condition is not, the state machine remains in state IDLE to wait for the previous PCI cycle to complete.

In the transition from state IDLE to state PCI, the signal D_RUNIMSTCYCLE is asserted high, which one CLK2 period later causes the signal RUNIMSTCYCLE to be asserted high. The signal S RUNIMSTCYCLE provided to the PCI bus master logic 204 is the signal RUNIMSTCYCLE synchronized to the PCI bus clock PCICLK. In the transition, a signal D_SMP2PCIINPROG is also asserted high to indicate that a SMP-to-PCI cycle is in progress. In state PCI, the signal D_RUNIMSTCYCLE is expressly set high to re-request a preempted SMP-to-PCI cycle, as will be explained more fully below.

The cycle dispatch state machine transitions from state IDLE to state PCIDEF if the first and second conditions discussed above are true, the third condition is not true, and a signal GNT2SMP is asserted high and memory and I/O broadcast cycles to the PCI bus 102 are enabled. If the signal GNT2SMP is asserted high, but not PCIGNT2SMP, that indicates the requested address is in SM address space but a broadcast is enabled to determine if a device on the PCI bus 102 or the other buses have a matching address. In the transition from state IDLE to state PCIDEF, the state of the output enable signal D_SDOE_ is set equal to the state of the processor write/read signal I_PWR, which is driven high for a processor write and low for a processor read cycle. If asserted low, the signal D_SDOE_ enables the SMC 134 to drive the data portion of the SM bus 128.

The state machine transitions from state PCIDEF to state PCI if the signal S_IMSTDONE is negated low to indicate that the previous PCI cycle run by the PCI master logic 204 has completed. The signal S_IMSTDONE is the signal IMSTCYCLEDONE synchronized to the CLK2 clock. As explained above, the signal IMSTCYCLEDONE is not negated until the SM arbiter 146 negates the signal S_RUNIMSTCYCLE to indicate that the SMP 126 has received the requested data if a SMP-to-PCI read cycle. If the signal S_IMSTDONE is asserted high, that indicates that the previous SMP-to-PCI cycle is not yet completed. The state machine remains in state PCIDEF until the signal S_IMSTDONE is negated low. In the transition from state PCIDEF to state PCI, both signals D_RUNIMSTCYCLE and D_SMP2PCIINPROG are asserted high to request a SMP-to-PCI cycle and to indicate that such cycle is in progress.

In state PCI, if the signal S_IMSTDONE is negated low indicating that the SMC 134 is waiting for the PCI master logic 204 to complete a PCI cycle for the SMP 126, and if the signal S_ISLREQ is asserted high indicating that the PCI slave logic 202 is requesting a cycle, the state machine transitions back to state IDLE. In the transition, the signal D_RUNIMSTCYCLE is negated low and a SMP request preempt signal D_PREQPREMPT is asserted high, which causes a signal PREQPREMPT to be driven high one CLK2 period later. The signal PREQPREMPT when asserted high causes the signal ADFLT to be driven high to tristate the address and data signals PA and PD of the SMP 126 from the SM local bus 128. Thus, if a SMP-to-PCI cycle is pending, and a request comes in from the PCI bus 102 via the PCI slave logic 202, the SMP request is preempted to prevent a potential deadlock condition.

From state IDLE, the cycle dispatch state machine dispatches the appropriate cycle on the SM local bus 128 to SM resources such as SM memory 138, the video controller 150, the ROM 132 or other SM bus slave devices.

For exemplary purposes, a PCI master request for the SM memory 138 is assumed. The SM arbiter 146 drives a signal MEMGNT2PCI high to indicate that a PCI-to-SM memory cycle has been granted. Thus, if the signal MEMGNT2PCI is asserted (or if a memory grant to SMP signal MEMGNT2SMP is asserted) and if the first condition described for the transition from state IDLE to state PCI is true, indicating that the SMC 134 is not currently processing a request, and if the signal REFRESHSMP, the signal SMCREGSGNT2PCI, and the AND of the signals SMCREGSGNT2SMP and CFGCYCLE_SMP_MATCH are not true to indicate that a refresh request, a PCI-to-SMC-register request, or a SMP-to-SMC-register request is not asserted, the cycle dispatch state machine transitions from state IDLE to state MEM. In the transition, a signal D_RUNMEMCYCLE high to request the MCON 136 to run a memory cycle. If the current cycle is a SMP-requested cycle, the signal D_SDOE_ is asserted low to enable the SMC 134 to drive the data bus SD of the SM bus 102. If the current cycle is a PCI master cycle, then the signal D_SAOE_ is driven low to enable the SMC address output buffers and the signal D_SDOE_ is set equal to the inverted state of a signal ISLWR, which is asserted high if a PCI master write cycle is requested.

When the MCON 136 completes the memory cycle, it drives a signal D_MEMCYCLEDONE high. The signal D_MEMCYCLEDONE is latched internally in the SM arbiter 146 as a signal MEMDONE. While the signal MEMDONE is negated, the state machine remains in state MEM. On the assertion of the signal MEMDONE, the state machine transitions from state MEM to state DONE. In the transition, if the current cycle is requested by a PCI master (i.e. a signal CYCLMSTR is negated low indicating that a PCI master is the arbitration winner), a signal D_ISLDONE is asserted high, which in turn drives a signal ISLDONE high one CLK2 period later. The signal S_SLDONE provided back to the PCI slave logic 202 is the signal ISLDONE synchronized to the signal PCICLK. If instead the current memory cycle is a SMP requested cycle (i.e. the signal CYCLMSTR is asserted high), then a signal D_CLK2PDONE is asserted high to drive the completion signal PDONE high to the PCON 142.

Requests for other resources on the SM local bus 128 such as the ROM 132 and the video controller 150 by a PCI master are handled by the LBCON 144. These other cycles are handled in other states of the cycle dispatch state machine, with the state machine transitioning to state DONE when the local bus cycles have completed.

When a SMP-to-PCI cycle has completed, i.e., the signal S_IMSTDONE is asserted, the state machine transitions from state PCI to state DONE. If the signal S_IMSTDONE is negated low and the signal S_ISLREQ is also negated low, the state machine remains in state PCI to await the indication from the PCI master logic 204 that the SMP-to-PCI cycle has completed. In the transition from state PCI to state DONE, the signal D_CLK2PDONE is asserted high, which one CLK2 period later drives the signal CLK2PDONE high. This in turn drives the signal PDONE high to the PCON 142. Also, in the transition from state PCI to state DONE, the signals D_SMP2PCIINPROG and D_PREQPREMPT are negated low. The signal D_SDOE_ is asserted low if the signal I_PWR is low indicating a SMP read cycle. This allows the SMC 134 to drive the read data from the PCI bus 102 on to the SM bus 128.

In state DONE, if the current cycle belongs to the SMP 126, as indicated by the signal CYCIMSTR being asserted high, if the SMP request PREQ is negated by the PCON 142, and if the SMP cycle is not a read cycle directed to a SM bus slave (i.e., the signal I_PWR is negated low negated low and the signal LBDONE is asserted high), the state machine transitions back to state IDLE. The signal PREQ is asserted high by the PCON 142 when it detects a SMP cycle on the SM bus 128 for the memory 138 or the ROM 132. The signal PREQ is maintained high by the PCON 142 until it receives the signal PDONE from the SM arbiter 146. When the signal PDONE is asserted, the signals PREQ and READY* are negated one CLK2 period later. The signal LBDONE is a latched version of the signal LBCYCLEDONE driven by the LBCON 144.

Similarly, if the current cycle belongs to the PCI slave logic 202, as indicated by the signal CYCLMSTR being negated low, if the slave logic request S_ISLREQ is negated low by the PCI slave logic 202, and if the signal PREQPREMPT is negated low, the state machine also transitions from state DONE back to state IDLE. The signal ISLREQ is asserted by the PCI slave logic 202 when a PCI cycle directed to SM address space is detected. The signal ISLREQ is maintained asserted until the signal S_ISLDONE is asserted by the SM arbiter 146.

In the transition back to state IDLE, the signals D_RUNMEMCYCLE and D_RUNLBCYCLE are negated low to negate request signals RUNMEMCYCLE and RUNLBCYCLE to the MCON 136 and LBCON 144, respectively. In addition, the signal D_SAOE_ is negated to stop driving the address bus SA on the local bus 128. In addition, if the signal CYCLMSTR is asserted high, indicating that the current cycle belongs to the SMP 126, the signal D_CLK2PDONE is negated low. In addition, the data output enable signal D_SDOE_ is set high if the signal I_PWR is high or the signal RUNIMSTCYCLE is deasserted low to stop driving the data bus SD to avoid data contention with the following SMP write cycle if the current cycle is not a SMP-to-PCI cycle. If the signal RUNIMST-CYCLE is asserted high and the signal I_PWR is driven low, indicating a SMP-to-PCI read cycle, the signal SDOE_ is asserted for one more CLK2 clock to drive the read data from the PCI bus 102.

In the transition from state DONE to state IDLE, if the signal CYCLMSTR is negated low, indicating that the current cycle belongs to a PCI master, the signal D_ISLDONE is negated low and the data output enable signal D_SDOE_ is negated high.

In state DONE, if the SMC 134 is running a cycle for a PCI master after preempting a SMP-to-PCI request, the SMP-to-PCI cycle must be re-requested after the PCI master cycle has completed. Thus, if the signals CYCIMSTR and S_ISLREQ are negated low to indicate the completion of the PCI master requested cycle, and the signal PREQPREMPT is asserted high, the state machine transitions from state DONE to state FLT. In the transition, the signal D_SDOE_ is set equal to the state of the signal I_PWR. In state FLT, the signal D_PREQPREMPT is negated low to drive the float signal ADFLT low to re-enable processor address and data signals. Next, the state machine transitions from state FLT to state PCI, setting a signal D_RELTCHSMPWTDATA to the state of the signal I_PWR. Thus, if the preempted SMP request is a write cycle, the write data driven by the SMP 126 is relatched from the local data bus SD. As mentioned above, in state PCI, the signal D_RUNIMSTCYCLE is reasserted high to request the PCI master logic 204 to run the SMP-to-PCI cycle. Thus, in this way, the preempted SMP-to-PCI cycle is completed after the PCI-to-SM-bus cycle has been run.

Figure 4:
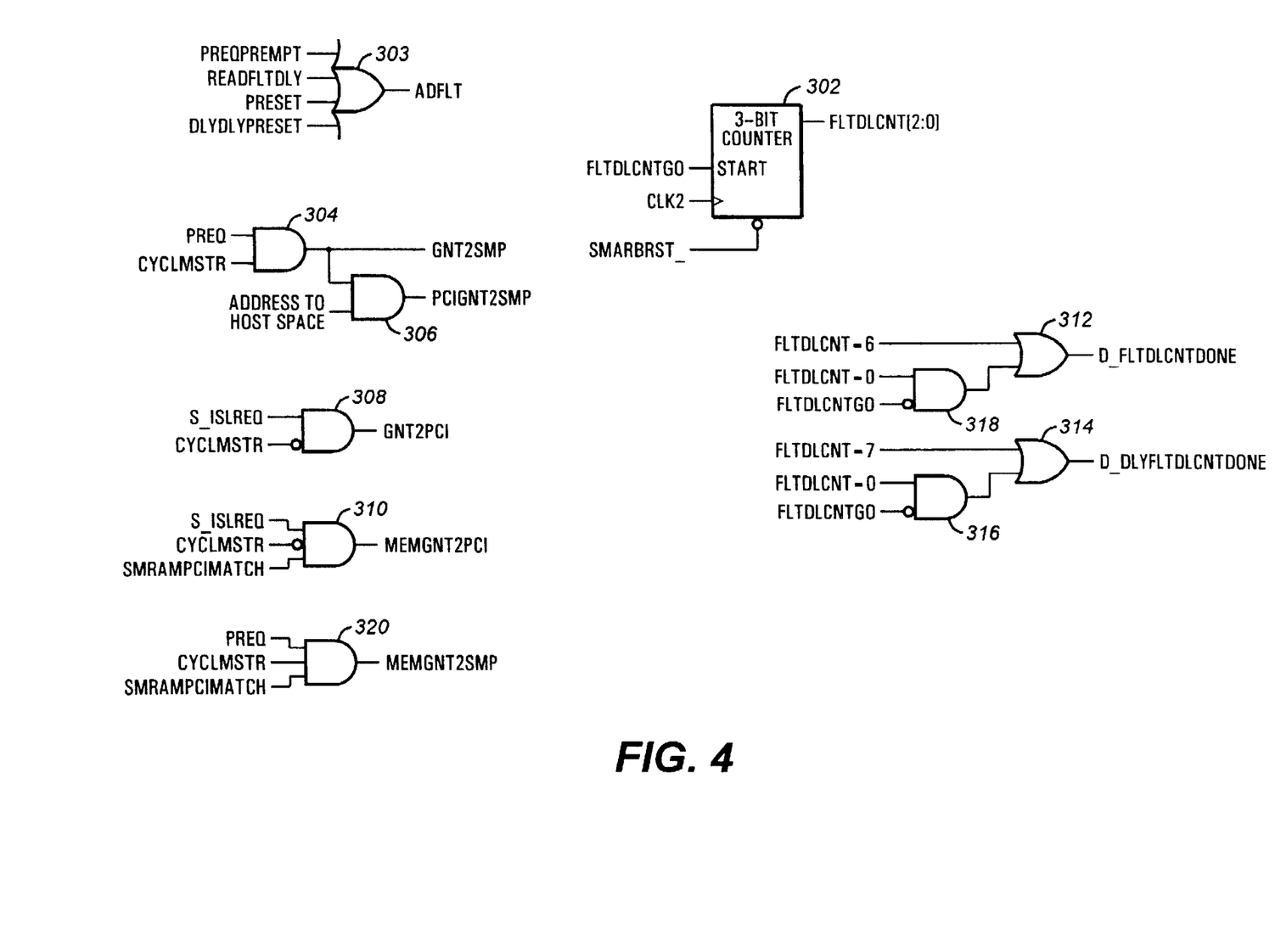
FIG. 4 is a schematic diagram of logic for interacting with the cycle dispatch state machine of FIGS. 3A and 3B.

A source of contention may also exist between write data driven by the SMP 126 in a current cycle and read data driven by a SM bus slave in response to a previous SMP read cycle. When a SMP read cycle is directed to a SM bus slave, and the SMP 126 is requesting a write in the next cycle, data contention may occur if the SM bus slave requires a long delay to float its data output pins. After the signal READY* is asserted by the PCON 142 for the previous cycle, the SMP 126 is allowed to drive the write data for the next write cycle. The write data of the SMP 126 may conflict with the read data still driven by a slow SM bus slave. To prevent contention, the address and data signals driven by the SMP 126 are tristated by the tristate buffers 130. Thus, if the signal CYCIMSTR is asserted high and the signal I_PWR is negated low to indicate a SMP read cycle, if the signal PREQ is negated low, and if the signal LBDONE is asserted high to indicate that the LBCON 144 has completed the SM bus cycle, the cycle dispatch state machine transitions from state DONE to state FLOAT. In the transition, the signal D_FLTDLCNTGO is asserted high to start a float count delay counter 302 (FIG. 4). In the transition, the signal D_CLK2PDONE is negated low, and the address output enable signal D_SAOE_ is negated high. The signal D_SDOE_ is negated high if the current cycle is a write cycle or if the signal RUNIMSTCYCLE is negated low. If the signal RUNIMSTCYCLE is asserted high and the signal I_PWR is driven low to indicate a SMP-to-PCI read cycle, the signal D_SDOE_ is extended by one CLK2 period for the read data from the PCI bus 102.

In state FLOAT, a signal D_READFLTDLY is asserted high, which one CLK2 period later drives a signal READ-FLTDLY high, which in turn drives the float signal ADFLT high to tristate the output signals from the SMP 126. If the float delay counter 302 counts to the value 7. a signal DLYFLTDLCNTDONE is driven high. If the signal DLYFLTDLCNTCDONE is driven high and the signal FLTDLCNTGO is negated low, or if the signal CYCLMSTR is negated low indicating that the bus has been given to a PCI master (which means that data contention will not occur between the SMP 126 and a SM bus slave), the cycle dispatch state machine transitions from state FLOAT to state IDLE. In the transition from state FLOAT to state IDLE. the signal D_READFLTDLY is negated low. Otherwise, if the condition causing the transition from state FLOAT to state IDLE is not true, the state machine remains in state FLOAT. In state FLOAT. if a signal FLTDLCNTDONE is asserted high, indicating that the float delay counter 302 has counted to the value 6, the signal D_READFLTDLY is negated low to drive the signal ADFLT low in the next CLK2 period.

In summary, when the PCON 142 detects a cycle generated by the SMP 126 from the processor output control signals. the PCON 142 asserts the signal PREQ. If the cycle is directed to host address space or if a broadcast is desired, then the cycle dispatch state machine transitions from state IDLE to state PCI, or from state IDLE to state PCIDEF to state PCI. In the transition to state PCI, the signal D_RUNIMSTCYCLE is asserted to cause the signal S_RUNIMSTCYCLE to be asserted. In response to assertion of the signal S_RUNIMSTCYCLE, the PCI master logic 204 starts a request for the PCI bus 102. However, if another PCI bus master already has control of the PCI bus 102 and asserts a request for the SM bus 128 or SM memory 138. the PCI slave logic 202 asserts the signal ISLREQ, which drives the signal S_ISLREQ internally in the SM arbiter 146. In state PCI, if the cycle dispatch state machine detects that the signal S_ISLREQ is asserted and the PCI master done signal S_IMSTDONE is deasserted, the SMP-to-PCI request is preempted and the state machine transitions to state IDLE to handle the request from the PCI slave logic 202.

Even though the SMP request is preempted, the PDONE signal is not asserted by the SM arbiter 146. Therefore, the PCON 142 does not assert the READY* or NA* signal back to the SMP 126. Consequently, while the SMC 134 is performing the request from the PCI slave logic 202. the control signals of the SMP 126 remain unchanged. To avoid contention. the data and address signals PD and PA of the SMP 126 are isolated by asserting the signal ADFLT. Thus, the SMP 126 continues to wait for the SMP-to-PCI cycle to complete even though the cycle has been preempted in the SMC 134.

Once the cycle requested by the PCI slave logic has completed, the cycle dispatch state machine proceeds to state DONE. The state machine next proceeds to state FLT. where the signal D_PREQPREMPT signal is deasserted for re-enabling the tristate buffers 130. Next, the state machine transitions back to state PCI to complete the SMP-to-PCI cycle. Once the SMP-to-PCI cycle is completed on the PCI bus 102. the PCI master logic 204 asserts the signal IMSTCYCLEDONE to cause the state machine to transition to state DONE. In the transition, the signal D_CLK2PDONE is asserted to cause the signal PDONE to be asserted to the PCON 142, which then responds by driving the READY* or NA* signal back to the SMP 126.

Referring now to FIG. 4, a schematic diagram of various logic for interacting with the cycle dispatch state machine of FIGS. 3A and 3B is shown. The signal ADFLT is provided by a four-input OR gate 303, whose inputs receive the signal PREQPREMPT. the signal READFLTDLY, SMP reset signal PRESET. and a delayed version DLYDLYPRESET of the SMP reset signal. The signal GNT2SMP is driven by a two-input AND gate 304, whose inputs receive the SMP request signal PREQ and the signal CYCLMSTR. As noted above, the signal CYCLMSTR is asserted high if the SMP 126 wins the arbitration cycle and negated low if the PCI slave logic 202 wins the arbitration cycle. The signal GNT2SMP is provided to one input of an AND gate 306, whose other input receives a signal that is driven high if an address directed to host address space is decoded. Thus, if the SMP 126 wins the arbitration cycle, and the requested address is to host space, the AND gate 306 drives the signal PCIGNT2SMP high to indicate a PCI-to-SMP cycle.

A signal GNT2PCI is driven by a two-input AND gate 308, whose inputs receive the PCI slave request signal S_ISLREQ and the inverted state of the signal CYCLMSTR. When asserted high, the signal GNT2PCI indicates that a PCI master has been granted access to SM space. The signal MEMGNT2PCI is driven by a three-input AND gate 310, whose inputs receive the signal S_ISLREQ, the inverted state of the signal CYCLMSTR, and a signal SMRAMPCIMATCH, which is asserted high to indicate that the requested PCI address matches the address space allocated to the SM memory 138. The signal MEMGNT2SMP is driven by an AND gate 320, whose inputs receive the signals PREQ, CYCLMSTR and SMRAMSMPMATCH.

The float delay counter 302 is clocked on the rising edge of the signal CLK2 and reset on the negative edge of the signal SMARBRST_. The counter 302 is started when the signal FLTDLCNTGO is asserted. The output of the counter 302 provides signals FLTDLCNT[2:0]. When the signal FLTDLCNTGO is asserted high, the counter 302 starts counting from the value 0. Once started, the counter 302 continues to count regardless of the state of the signal FLTDLCNTGO until it reaches the value 7 and wraps around to the value 0. The float count done signal D_FLTDLCNTDONE is driven by an OR gate 312, whose first input receives a signal FLTDLCNT=6, indicating that the counter 302 has counted to the value 6. The other input of the OR gate 312 is connected to the output of an AND gate 318. whose first input receives a signal FLTDLCNT=0 and whose second input receives the inverted state of the signal FLTDLCNTGO. Thus, the signal D_FLTDLCNTDONE is asserted high when the counter 302 reaches the value 6 or when the counter 302 is idle at the 0 value.

A signal D_DLYFLTDLCNTDONE is provided by an OR gate 314, whose first input receives a signal FLTDLCNT=7, indicating that the counter 302 has counted to the value 7. The other input of the OR gate 314 is connected to the output of an AND gate 316, whose first input receives a signal FLTDLCNT=0, and whose other input receives the inverted state of the signal FLTDLCNTGO. Thus, the signal D_DLYFLTFLCNTDONE is asserted high when the counter 302 reaches the value 7 or when the counter 302 is idle at the 0 value. The signals D_FLTDLCNTDONE and D_DLYFLTDLCNTDONE drive the signals FLTDLCNTDONE and DLYFLTDLCNTDONE, respectively, to the cycle dispatch state machine.

Thus, circuitry has been described for tristating the address and data outputs of a processor to prevent a deadlock condition when the processor and another bus master is accessing a shared resource. The processor is located on a first bus and the other bus master is located on a second bus. In the preferred embodiment, bi-directional tristate buffers are placed between the address and data output pins of the processor and the address and data portions of the first bus. If the processor is requesting a first-bus-to-second-bus cycle, and the second bus master is asserting a request for a first bus shared resource, the processor address and data output pins are tristated by the tristate buffers to allow the second bus master cycle to proceed. After the second bus master cycle completes, the tristate buffers are re-enabled to allow the processor cycle to complete.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A circuit for preventing deadlock between a microprocessor coupled to a first bus and a bus master coupled to a second bus, wherein the microprocessor has data and address outputs for connection to the first bus and has cycle control outputs, and wherein the first bus has data and address portions and is coupled to a resource, the circuit comprising:

first means for receiving the microprocessor cycle control outputs to determine a request by the microprocessor for a microprocessor-to-second-bus cycle, wherein the microprocessor continuously drives or controls its address, data, and control cycle outputs once it starts said microprocessor-to-second-bus cycle;

second means for receiving a request from the second bus master for the first bus resource;

means coupled to said first and second receiving means for generating a float signal, said float signal being asserted if said microprocessor-to-second-bus cycle request is pending when said second bus master request is asserted; and a plurality of tristate buffers responsive to said float signal, said tristate buffers being connected between the microprocessor data and address outputs and said first bus data and address portions, said plurality of tristate buffers being disabled if said float signal is asserted, wherein said tristate buffers are implemented with bi-directional high speed bus switches.

2. The circuit of claim 1, further comprising:

means coupled to said second receiving means and said float signal generating means for executing said second bus master request after said float signal is asserted and for asserting a complete signal when done, wherein said float signal generating means deasserts said float signal after said complete signal is asserted; and means responsive to said complete signal for completing said microprocessor-to-second-bus cycle after said complete signal is asserted.

3. The circuit of claim 1, wherein the microprocessor is a 80386-type processor.

4. The circuit of claim 3, wherein the microprocessor is a 386EX processor.

5. The circuit of claim 1, wherein the second bus is a PCI bus.

6. The circuit of claim 5, wherein the second bus master is an expansion bus bridge for connection between said PCI bus and an expansion bus, said expansion bus being connected to an expansion bus master, wherein said expansion bus bridge asserts a request for the first bus resource in response to said expansion bus master asserting a request for the first bus resource.

7. The circuit of claim 6, wherein said expansion bus is an EISA bus.

8. The circuit of claim 6, wherein the microprocessor is a 80386-type processor.

9. The circuit of claim 8, wherein the microprocessor is a 386EX processor.

10. A circuit for preventing deadlock between a microprocessor coupled to a first bus and a bus master coupled to a second bus, wherein the microprocessor has data and address outputs for connection to the first bus and has cycle control outputs, and wherein the first bus has data and address portions and is coupled to a resource, the circuit comprising:

first means for receiving the microprocessor cycle control outputs to determine a request by the microprocessor for a microprocessor-to-second bus cycle, wherein the microprocessor continuously drives or controls its address, data, and control cycle outputs once it starts said microprocessor-to-second-bus cycle;

second means for receiving a request from the second bus master for the first bus resource;

means coupled to said first and second receiving means for generating a float signal, said float signal being asserted if said microprocessor-to-second-bus cycle request is pending when said second bus master request is asserted; and a plurality of tristate buffers responsive to said float signal, said tristate buffers being connected between the microprocessor data and address outputs and said first bus data and address portions, said plurality of tristate buffers being disabled if said float signal is asserted, wherein the first bus is further coupled to a first bus slave device, the microprocessor capable of generating a read cycle and a write cycle on the first bus, wherein said first bus slave device drives said first bus data portion in response to a read cycle directed to said first bus slave device, and wherein said float signal generating means asserts said float signal for a predetermined amount of time after a microprocessor read cycle is complete to avoid data contention between a subsequent microprocessor write cycle and read data driven by said first bus slave device.

11. A computer system, comprising:

a first bus having data and address portions;

a processor unit coupled to said first bus, said processor unit receiving a float signal and having address, data and cycle control output pins, said processor unit further including an 80386-type microprocessor, said processor unit address and data output pins being connected to said first bus address and data portions;

a bus resource coupled to said first bus;

a second bus;

a second bus master coupled to said second bus; and a circuit coupled to said first and second buses, including:

first means for receiving the processor cycle control output pins to determine a request by said processor unit for a processor-to-second-bus cycle, wherein said processor unit continuously drives or controls its address, data, and cycle control output pins once it starts said processor-to-second-bus cycle;

second means for receiving a request from said second bus master for said first bus resource; and means coupled to said first and second receiving means for generating said float signal, said float signal being asserted if said processor-to-second-bus cycle request is pending when said second bus master request is asserted, wherein if said float signal is asserted, said processor unit floats its address and data output pins and continues to drive the cycle control output pins, wherein said processor unit further includes a plurality of tristate buffers responsive to said float signal, said tristate buffers being connected between said microprocessor data and address outputs and said processor unit data and address output pins, said plurality of tristate buffers being disabled if said float signal is asserted, and wherein said tristate buffers are implemented with bidirectional high speed bus switches.

12. The circuit of claim 11, further comprising:

means coupled to said second receiving means and said float signal generating means for executing said second bus master request after said float signal is asserted and for asserting a complete signal when done, wherein said float signal generating means deasserts said float signal after said complete signal is asserted; and means responsive to said complete signal for completing said processor-to-second-bus cycle after said complete signal is asserted.

13. The computer system of claim 11, wherein said 80386-type microprocessor is a 386EX microprocessor.

14. A computer system, comprising:

a first bus having data and address portions;

a microprocessor coupled to said first bus and having address, data and cycle control outputs;

a bus resource coupled to said first bus;

a second bus;

a second bus master coupled to said second bus; and a circuit coupled to said first and second buses, including:

first means for receiving said cycle control outputs to determine a request by said microprocessor for a microprocessor-to-second-bus cycle, wherein said microprocessor continuously drives or controls its address, data, and cycle control outputs once it starts said microprocessor-to-second-bus cycle;

second means for receiving a request from said second bus master for said first bus resource;

means coupled to said first and second receiving means for generating a float signal, said float signal being asserted if said microprocessor-to-second-bus cycle request is pending when said second bus master request is asserted; and a plurality of tristate buffers responsive to said float signal, said tristate buffers being connected between said microprocessor data and address outputs and said first bus data and address portions, said plurality of tristate buffers being disabled if said float signal is asserted, wherein said tristate buffers are implemented with bi-directional high speed bus switches.

15. The computer system of claim 14, further comprising:

means coupled to said second receiving means and said float signal generating means for executing said second bus master request after said float signal is asserted and for asserting a complete signal when done, wherein said float signal generating means deasserts said float signal after said complete signal is asserted; and means responsive to said complete signal for completing said processor-to-second-bus cycle after said complete signal is asserted.

16. The computer system of claim 14, wherein said microprocessor is a 80386-type processor.

17. The computer system of claim 16, wherein said microprocessor is a 386EX processor.

18. The computer system of claim 14, wherein said second bus is a PCI bus.

19. The computer system of claim 18, wherein said second bus master is an expansion bus bridge for connection between said PCI bus and an expansion bus, said expansion bus being connected to an expansion bus master, wherein said expansion bus bridge asserts a request for said first bus resource in response to said expansion bus master asserting a request for said first bus resource.

20. The computer system of claim 19, wherein said expansion bus is an EISA bus.

21. The computer system of claim 19, wherein said microprocessor is a 80386-type processor.

22. The computer system of claim 21, wherein said microprocessor is a 386EX processor.

23. A computer system, comprising:

a first bus having data and address portions;

a microprocessor coupled to said first bus and having address, data and cycle control outputs;

a bus resource coupled to said first bus;

a second bus;

a second bus master coupled to said second bus; and a circuit coupled to said first and second buses, including:

first means for receiving said cycle control outputs to determine a request by said microprocessor for a microprocessor-to-second-bus cycle, wherein said microprocessor continuously drives or controls its address, data, and cycle control outputs once it starts said microprocessor-to-second-bus cycle;

second means for receiving a request from said second bus master for said first bus resource;

means coupled to said first and second receiving means for generating a float signal, said float signal being asserted if said microprocessor-to-second-bus cycle request is pending when said second bus master request is asserted; and a plurality of tristate buffers responsive to said float signal, said tristate buffers being connected between said microprocessor data and address outputs and said first bus data and address portions, said plurality of tristate buffers being disabled if said float signal is asserted, wherein said first bus is further coupled to a first bus slave device, said microprocessor capable of generating a read cycle and a write cycle on said first bus, wherein said first bus slave device drives said first bus data portion in response to a read cycle directed to said first bus slave device, and wherein said float signal generating means asserts said float signal for a predetermined amount of time after a microprocessor read cycle is complete to avoid data contention between a subsequent microprocessor write cycle and read data driven by said first bus slave device.

24. A method of preventing deadlock between a microprocessor coupled to a first bus and a bus master coupled to a second bus, wherein the microprocessor has data and address outputs for connection to the first bus, and has cycle control outputs, wherein the first bus has data and address portions and is coupled to a resource, and wherein a plurality of tristate buffers are connected between the microprocessor data and address outputs and said first bus data and address portions, the method comprising the steps of:

receiving the microprocessor cycle control outputs to determine a request by the microprocessor for a microprocessor-to-second-bus cycle;

receiving a request from the second bus master for the first bus resource;

asserting a float signal if said microprocessor-to-second-bus cycle request is pending when said second bus master request is asserted, wherein said plurality of tristate buffers are disabled if said float signal is asserted;

executing said second bus master request after said float signal is asserted;

asserting a complete signal when said second bus master request is done;

deasserting said float signal after said complete signal is asserted; and completing said microprocessor-to-second-bus cycle after said complete signal is asserted, wherein the microprocessor continuously drives or controls its data, address, and cycle control outputs once a microprocessor cycle has started and until said microprocessor-to-second-bus cycle has completed, wherein said tristate buffers are implemented with bi-directional high speed bus switches.

25. The method of claim 24, wherein the microprocessor is a 80386-type processor.

26. The method of claim 25, wherein the microprocessor is a 386EX processor.

27. The method of claim 24, wherein the second bus is a PCI bus.

28. The method of claim 27, wherein the second bus master is an expansion bus bridge for connection between said PCI bus and an expansion bus, said expansion bus being connected to an expansion bus master, wherein said expansion bus bridge asserts a request for the first bus resource in response to said expansion bus master asserting a request for the first bus resource.

29. The method of claim 28, wherein said expansion bus is an EISA bus.

30. The method of claim 29, wherein the microprocessor is a 80386-type processor.

31. The method of claim 30, wherein the microprocessor is a 386EX processor.

32. A microprocessor having address, data and cycle control output pins and receiving a float signal, the microprocessor comprising:

a microprocessor core having address, data, and cycle control outputs, wherein said microprocessor core continuously drives or controls its address, data, and cycle control outputs once it starts a cycle; and means coupled to said microprocessor core address, data and cycle control outputs for coupling said microprocessor core address, data and cycle control outputs to said microprocessor address, data and cycle control output pins, said means receiving the float signal, wherein if the float signal is asserted, said means floats said microprocessor address and data output pins and continues to drive said microprocessor cycle control output pins, wherein said coupling means includes a plurality of tristate buffers responsive to said float signal, said tristate buffers being connected between said microprocessor core data and address outputs and said microprocessor data and address output pins, said plurality of tristate buffers being disabled if said float signal is asserted, and wherein said tristate buffers are implemented with bi-directional high speed bus switches.

33. The microprocessor of claim 32, wherein said microprocessor is an 80386-type microprocessor.

34. The microprocessor of claim 33, wherein said 80386-type microprocessor is a 386EX microprocessor.

35. A computer system, comprising:

a first bus having data and address portions;

a second bus;

a storage system coupled to the first bus or the second bus;

a microprocessor coupled to the first bus, the microprocessor having address, data, and cycle control outputs, wherein the microprocessor continuously drives or controls its address, data, and cycle control outputs once it starts a microprocessor-to-second-bus cycle;

a first bus resource coupled to the first bus;

a second bus master coupled to the second bus; and a deadlock prevention circuit, including:
    a plurality of bi-directional high speed bus switches connected between the microprocessor data and address outputs and the first bus data and address portions;
    microprocessor-to-second-bus cycle decode logic coupled to the microprocessor cycle control outputs and decoding a pending microprocessor-to-second-bus cycle;
    second bus master to first bus resource decode logic coupled to the second bus master via the second bus and decoding a request from the second bus master for the first bus resource; and
    switch control logic coupled to and controlling the plurality of bi-directional high speed bus switches responsive to the microprocessor-to-second-bus cycle decode logic and the second bus master to first bus resource logic, the switch control logic disabling the switches when a microprocessor-to-second-bus cycle is pending while the second bus master is requesting the first bus resource.

36. The circuit of claim 35, wherein the microprocessor is a 80386-type processor.

37. The circuit of claim 36, wherein the microprocessor is a 386EX processor.

38. The circuit of claim 35, wherein the second bus is a PCI bus.

39. The circuit of claim 38, wherein the second bus master is an expansion bus bridge for connection between said PCI bus and an expansion bus, said expansion bus being connected to an expansion bus master, wherein said expansion bus bridge asserts a request for the first bus resource in response to said expansion bus master asserting a request for the first bus resource.

40. The circuit of claim 39, wherein said expansion bus is an EISA bus.

41. The circuit of claim 39, wherein the microprocessor is a 80386-type processor.

42. The circuit of claim 39, wherein the microprocessor is a 386EX processor.

43. A computer system, comprising:

a first bus having data and address portions;

a second bus;

a storage system coupled to the first bus or the second bus;

a microprocessor coupled to the first bus, the microprocessor having address, data, and cycle control outputs, wherein the microprocessor continuously drives or controls its address, data, and cycle control outputs once it starts a microprocessor-to-second-bus cycle, and wherein the microprocessor can generate a read cycle and a write cycle on the first bus;

a first bus resource coupled to the first bus;

a second bus master coupled to the second bus;

a first bus slave device coupled to the first bus, the first bus slave device driving the data portion of the first bus in response to a microprocessor read cycle; and a deadlock prevention circuit, including:
  a plurality of tristate buffers connected between the microprocessor data and address outputs and the first bus data and address portions;
  microprocessor-to-second-bus cycle decode logic coupled to the microprocessor cycle control outputs and decoding a pending microprocessor-to-second-bus cycle;
  second-bus-master-to-first-bus-resource decode logic coupled to the second bus master via the second bus and decoding a request from the second bus master for the first bus resource; and switch control logic coupled to and controlling the plurality of tristate buffers responsive to the microprocessor-to-second-bus cycle decode logic and the second-bus-master-to-first-bus-resource decode logic, the switch control logic turning off the tristate buffers when a microprocessor-to-second-bus cycle is pending while the second bus master is requesting the first bus resource, and the switch control logic turning off the tristate buffer for a predetermined amount of time after a microprocessor read cycle is complete to avoid data contention between a subsequent microprocessor write cycle and read data driven by the first bus slave device.

* * * * *